US012596342B2

(12) United States Patent
    Makino

(10) Patent No.: US 12,596,342 B2
(45) Date of Patent: Apr. 7, 2026

(54) CONTROL DEVICE

(71) Applicant: Fanuc Corporation, Yamanashi (JP)

(72) Inventor: Iwao Makino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 372 days.

(21) Appl. No.: 18/028,287

(22) PCT Filed: Oct. 5, 2021

(86) PCT No.: PCT/JP2021/036847
    § 371 (c)(1),
    (2) Date: Mar. 24, 2023

(87) PCT Pub. No.: WO2022/075327
    PCT Pub. Date: Apr. 14, 2022

(65) Prior Publication Data
    US 2023/0375997 A1    Nov. 23, 2023

(30) Foreign Application Priority Data
    Oct. 9, 2020    (JP) ................................. 2020-171357

(51) Int. Cl.
    *G05B 19/042*        (2006.01)
    *G06F 8/65*          (2018.01)
(52) U.S. Cl.
    CPC ........... *G05B 19/0426* (2013.01); *G06F 8/65* (2013.01); *G05B 2219/25124* (2013.01)
(58) Field of Classification Search
    None
    See application file for complete search history.

(56) References Cited

U.S. PATENT DOCUMENTS

2002/0198617 A1 * 12/2002 Baek ................ G05B 19/41865
                                                              700/96
2003/0037091 A1 * 2/2003 Nishimura ............ G06F 9/4881
                                                              718/103
(Continued)

FOREIGN PATENT DOCUMENTS

CN        106469074 A      3/2017
EP        3 379 358 A2     9/2018
(Continued)

OTHER PUBLICATIONS

International Search Report and Written Opinion for International Application No. PCT/JP2021/036847, dated Dec. 28, 2021, 6 pages.
(Continued)

*Primary Examiner* — Jason Lin
(74) *Attorney, Agent, or Firm* — BUCHANAN INGERSOLL & ROONEY PC

(57)    ABSTRACT

A control device having the function of creating new setting parameters, which are candidates of a parameter to be applied when updating old software to new software, is provided with a software information storage unit, a recommended parameter creating unit, and a parameter storage unit, wherein the software information storage unit acquires and stores, from a storage medium, new software including new item information and candidate value information relating to the parameter, the recommended parameter creating unit creates new recommended parameters on the basis of the new item information and the candidate value information, and the parameter storage unit stores one of the new recommended parameters selected by an operator as a new setting parameter.

4 Claims, 8 Drawing Sheets

(56) References Cited

U.S. PATENT DOCUMENTS

| | | | |
|---|---|---|---|
| 2005/0015767 A1* | 1/2005 | Nash | G06F 9/4887 |
| | | | 718/102 |
| 2007/0283358 A1* | 12/2007 | Kasahara | G06F 9/5044 |
| | | | 718/104 |
| 2008/0201697 A1* | 8/2008 | Matsa | G06F 40/205 |
| | | | 715/237 |
| 2008/0244592 A1* | 10/2008 | Uchihira | G06F 9/4881 |
| | | | 718/107 |
| 2012/0079494 A1* | 3/2012 | Sandstrom | G06F 9/4881 |
| | | | 718/104 |
| 2013/0219402 A1* | 8/2013 | Andrianiaina | G06F 11/008 |
| | | | 718/104 |
| 2013/0226724 A1* | 8/2013 | Felch | G06F 9/50 |
| | | | 705/26.3 |
| 2014/0366035 A1* | 12/2014 | Yasuda | G05B 19/0421 |
| | | | 718/105 |
| 2015/0089510 A1* | 3/2015 | Kozakai | G06F 9/4887 |
| | | | 718/103 |
| 2015/0135185 A1* | 5/2015 | Sirota | H04L 67/10 |
| | | | 718/103 |
| 2017/0146967 A1* | 5/2017 | Hatanaka | G05B 19/0421 |
| 2017/0248933 A1* | 8/2017 | Saijo | G05B 19/182 |
| 2017/0255490 A1* | 9/2017 | Aberg | G06F 9/50 |
| 2018/0032055 A1* | 2/2018 | Janssen | G06F 8/436 |
| 2019/0095247 A1* | 3/2019 | Shimamura | G05B 19/408 |
| 2019/0188110 A1* | 6/2019 | Ueyama | G05B 19/0425 |

FOREIGN PATENT DOCUMENTS

| | | |
|---|---|---|
| JP | S62-232007 A | 10/1987 |
| JP | 07319531 A | 12/1995 |
| JP | 09190204 A | 7/1997 |
| JP | 2005006450 A | 1/2005 |
| JP | 2015138362 A | 7/2015 |
| JP | 2019-109580 A | 7/2019 |

OTHER PUBLICATIONS

Office Action (Notice of Reasons for Refusal) issued Jun. 25, 2024, by the Japan Patent Office in corresponding Japanese Patent Application No. 2022-555512 and an English translation of the Office Action. (8 pages).

Office Action (The First Office Action) issued May 15, 2025, by the State Intellectual Property Office of People's Republic of China in corresponding Chinese Patent Application No. 202180067596.5 and an English translation of the Office Action. (18 pages).

* cited by examiner

FIG. 2

| No. | GROUP | ITEM | CANDIDATE VALUE |
|-----|-------|------|-----------------|
| F01 | GROUP 1 | #1000 | 10 TO 20 |
| F02 | GROUP 2 | #2000 | 30 TO 50 |
| F03 | GROUP 1 | #3000 | 100 TO 150 |
| F04 | GROUP 3 | #4000 | 300 TO 400 |
| F05 | GROUP 2 | #5000 | 500 TO 700 |

DO YOU ADOPT PRESENTED INFORMATION?

GROUP SELECTION

ITEM SELECTION

CANDIDATE VALUE SELECTION

Figure 6:
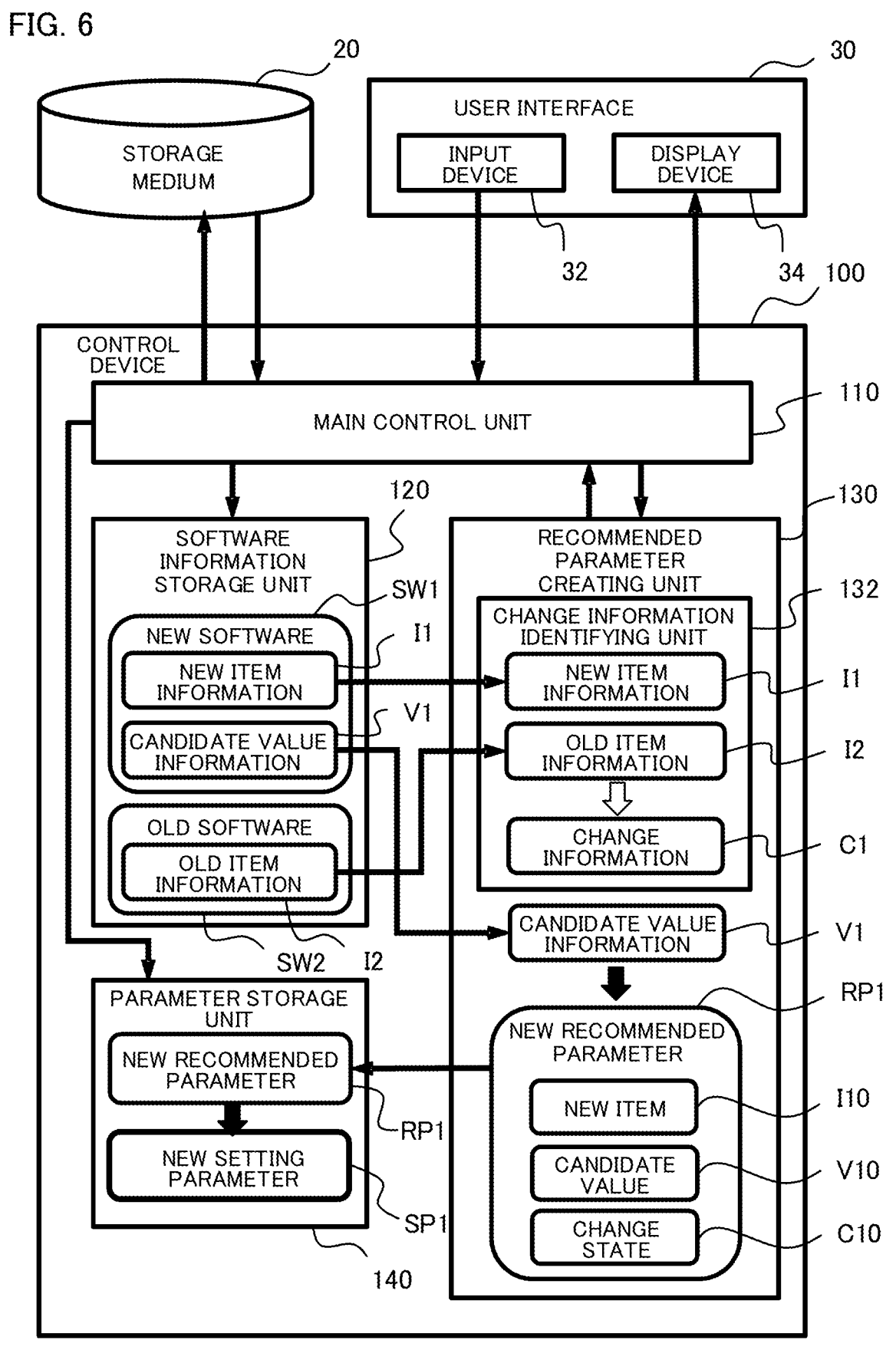

STORAGE MEDIUM — 20

USER INTERFACE — 30

INPUT DEVICE — 32

DISPLAY DEVICE — 34     100

CONTROL DEVICE

MAIN CONTROL UNIT — 110

— 130

SOFTWARE INFORMATION STORAGE UNIT — 120

RECOMMENDED PARAMETER CREATING UNIT

CHANGE INFORMATION IDENTIFYING UNIT — 132

NEW SOFTWARE — SW1

NEW ITEM INFORMATION — I1

CANDIDATE VALUE INFORMATION — V1

NEW ITEM INFORMATION — I1

OLD ITEM INFORMATION — I2

CHANGE INFORMATION — C1

OLD SOFTWARE

OLD ITEM INFORMATION

SW2     I2

CANDIDATE VALUE INFORMATION — V1

PARAMETER STORAGE UNIT

NEW RECOMMENDED PARAMETER — RP1

NEW RECOMMENDED PARAMETER

NEW ITEM — I10

CANDIDATE VALUE — V10

CHANGE STATE — C10

RP1

NEW SETTING PARAMETER — SP1

140

CONTROL DEVICE

CROSS REFERENCE TO RELATED APPLICATIONS

This is the U.S. National Phase application of PCT/JP2021/036847, filed Oct. 5, 2021, which claims priority to Japanese Patent Application No. 2020-171357, filed Oct. 9, 2020, the disclosures of each of these applications being incorporated herein by reference in their entireties for all purposes.

FIELD OF THE INVENTION

The present invention relates to a technique for updating a parameter when updating software, in particular, relates to a control device having a function of creating new setting parameters which are candidates to be applied to new software when old software is updated to the new software.

BACKGROUND OF THE INVENTION

A control device to be used in an industrial machine or others as represented by a machine tool executes software, such as control program, to control a control object. To such software, a parameter for operating the control object with various functions provided to the control device.

The software is stored in a flash memory (flash ROM) incorporated in the control device, and when a new version is released for fixing a bug, adding a new function and so on (hereinafter referred to as "new software"), the previous version stored in the memory (hereinafter referred to as "old software") is updated to the new software.

Such a software update includes a method for replacing the flash ROM incorporated in the control device with another flash ROM in which new software is stored, and a method for overwriting the old software stored in the flash ROM with new software by connecting an external storage medium storing the new software to the control device.

These methods require of an operator to visit a place where the control device is installed to update the software. Thus, the operator needs to bring the flash ROM and an external storage medium to the concerned place, and attaches and detaches them to and from the device. It imposes a great burden on the operator. In order to deal with the above problem, some methods have been offered that are capable of updating the software of the control device in a short time without imposing a heavy burden on the operator.

As an example of the above-described method of updating software, Patent Literature 1 discloses a method for rewriting a control program of a numerical controller which stores the control program in a rewritable nonvolatile memory, having transferring means provided in a terminal device installed at a place away from the numerical controller to transfer an update program to the numerical controller via a communication line, receiving means provided to the numerical controller to receive the update program sent via the communication line, and rewriting means for rewriting the control program stored in the nonvolatile memory in the numerical controller to the update program. In this way, since the update program is transferred from the terminal device connected to the numerical controller via the communication line to rewrite the control program in the nonvolatile memory in the numerical controller, the rewriting operation of the control program of the numerical controller can be carried out promptly.

PATENT LITERATURE

[Patent Literature 1] Japanese Patent Laid-Open Publication No. H07-319531

SUMMARY OF THE INVENTION

The above-described conventional solution to rewrite a control program does not require of an operator to visit a place where a control device is installed for conducting work, and thus the operator can update software promptly. However, in order to use a function revised and a function newly added by new software, it is necessary to conduct manual input or file input by the operator to set parameters for enabling these functions.

In general, the more function the control device has, the more parameters for each software need to be set. In addition, by changing a certain parameter, it may be necessary to change other parameters related to the concerned parameter, or setting ranges of the other parameters may change. Thus, in a case where the operator updates a parameter by manual input, the operator has to conduct time-consuming troublesome setting tasks, while referring to a reference document, such as an instruction manual, examine and set the presence of the other parameters related to the changed parameter or the occurrence of the change in the setting ranges of the other parameters, by way of example.

In a case where the setting of the parameter is performed by predetermined file input, the operator refers to an external storage medium to select a parameter file corresponding to new software, so as to read the file in the control device to set the parameter. Since this method uses a predetermined parameter file corresponding to the new software for conducting the setting, the setting can be finished in a short time.

However, while the update using the predetermined parameter file facilitates the setting, there is a drawback that the parameters are uniformly changed even if it is not desired to change existing parameters or apply additional functions for a reason that it is not desired to change the performance of a machine to be controlled, for instance. In such a case, the operator has to manually set parameters again with respect to portions where the change is not intended after the update using the predetermined parameter file. It puts a further burden on the operator.

For this reason, there is a demand for a control device capable of reducing the burden on the operator to update the parameters associated with the software update and providing flexibility in setting the parameters.

An aspect of the present invention is a control device having a function of creating new setting parameters that are candidates of a parameter to be applied to new software when old software is updated to the new software, the control device including a software information storage unit, a recommended parameter creating unit and a parameter storage unit, wherein the software information storage unit acquires and stores, from a storage medium, new software including new item information and candidate value information relating to the parameter, the recommended parameter creating unit creates new recommended parameters based on the new item information and the candidate value information, and the parameter storage unit stores one of the new recommended parameters selected by an operator as a new setting parameter.

In accordance with the aspect of the invention, new recommended parameters are created based on new item information and candidate value information of new software acquired from a storage medium, and one of the new recommended parameters selected by an operator is stored as a new setting parameter, thereby reducing a burden on the operator to update parameters associated with software update and providing flexibility in setting the parameters.

BRIEF DESCRIPTION OF THE DRAWINGS

FIG. 2 is a block diagram showing an example of a specific configuration and an operation of the control device shown in FIG. 1;

FIG. 6 is a block diagram showing an example of a specific configuration and an operation of a control device according to a third embodiment;

DETAILED DESCRIPTION OF EMBODIMENTS OF THE INVENTION

A description will now be made along with the accompanying drawings about an embodiment of a control device according to one representative example of the present invention, the control device having a function of creating new setting parameters which are candidates of a parameter to be applied to new software when updating old software to the new software.

First Embodiment

Figure 1:
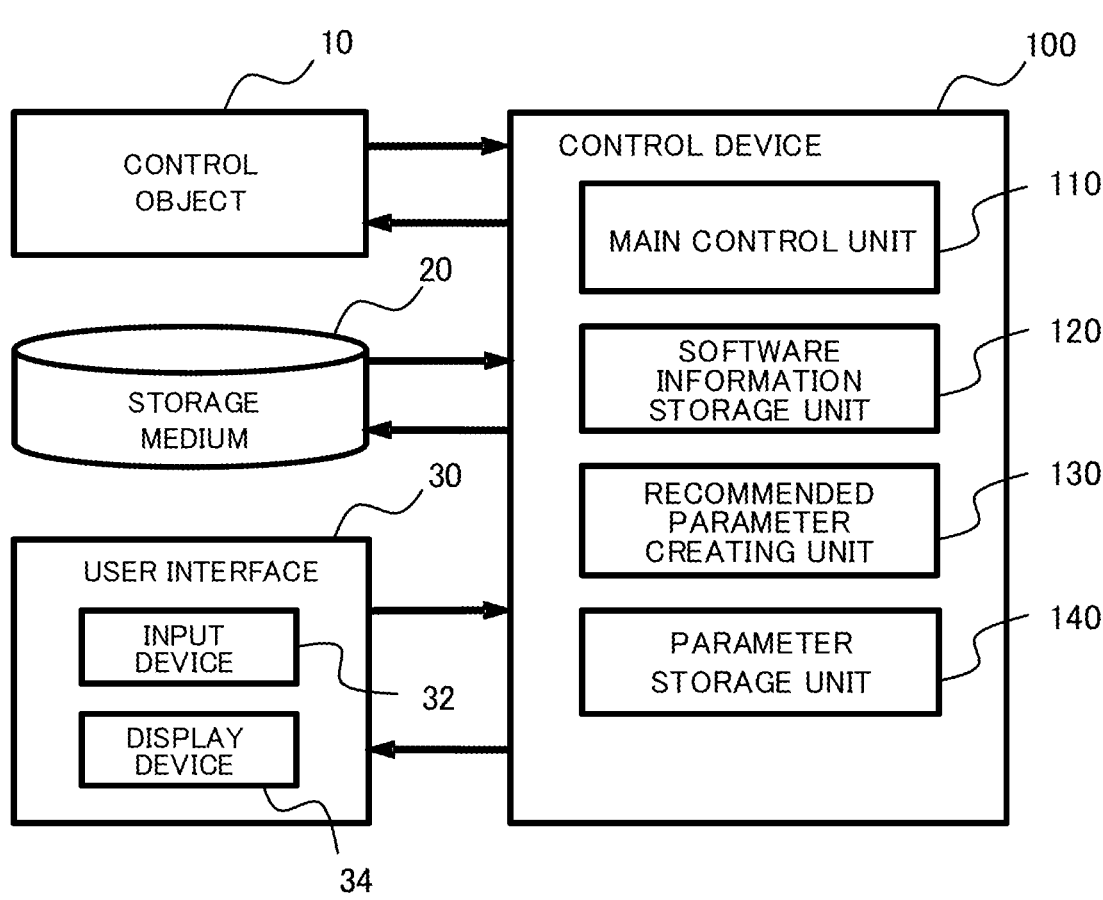
FIG. 1 is a block diagram showing a relationship between a control device and its peripheral devices according to a first embodiment.
Figure 2:
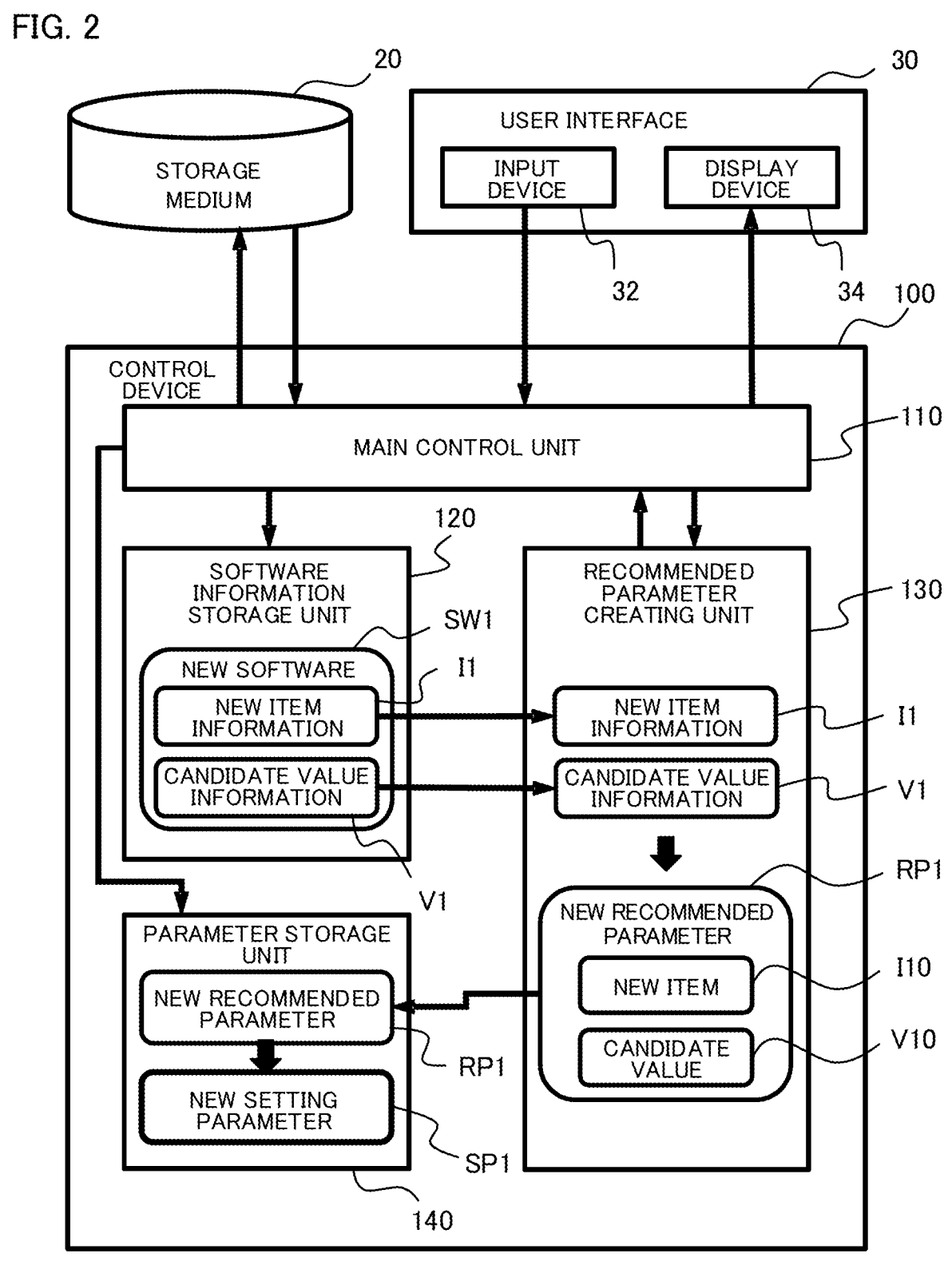
Figure 3:
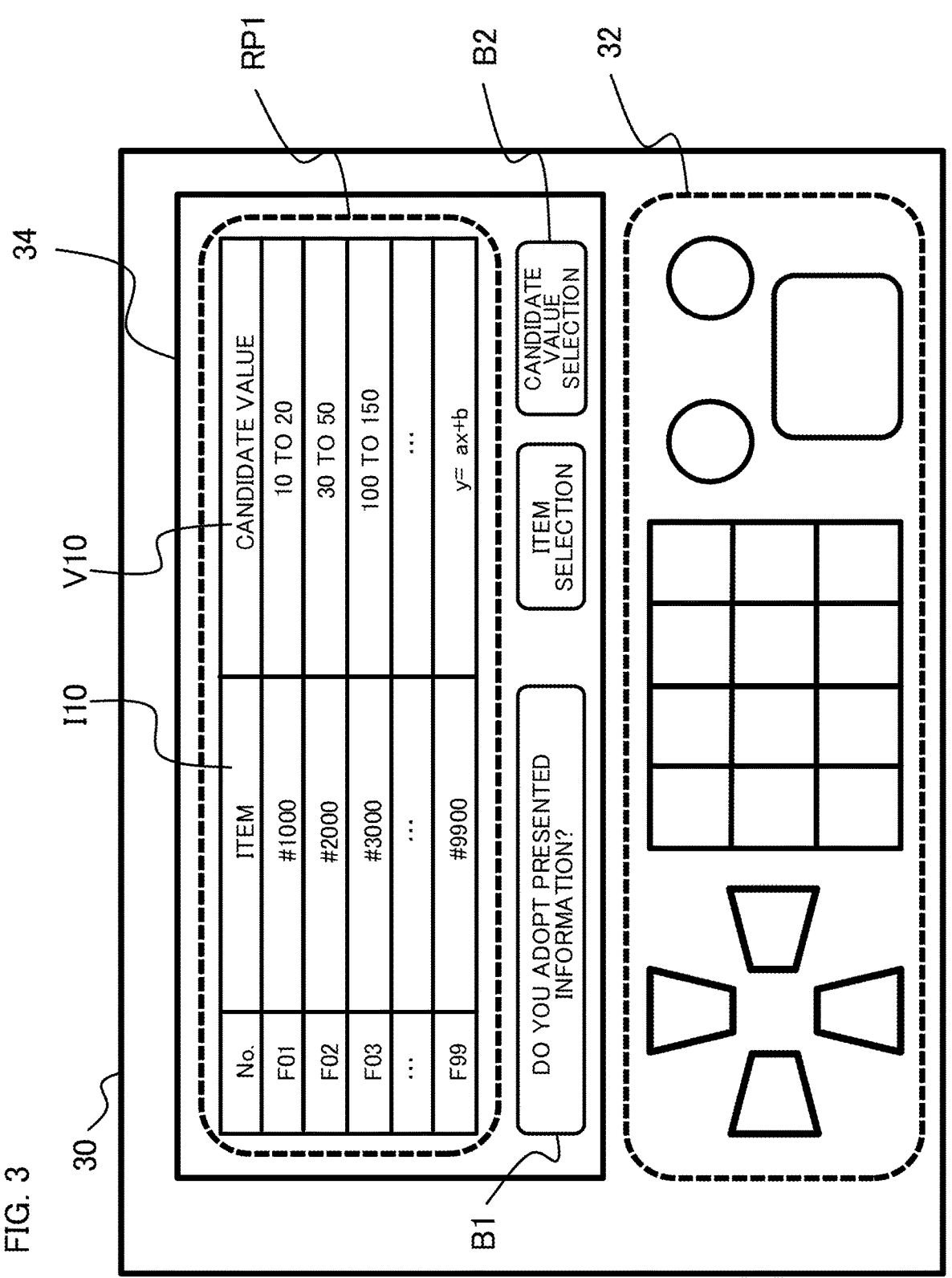
FIG. 3 is a schematic view showing an example of an outline of a user interface and its display screen shown in FIG. 1.

FIG. 1 is a block diagram showing a relation between a control device and its peripheral devices according to a first embodiment, which is one representative example of the invention. FIG. 2 is a block diagram showing an example of a specific configuration and an operation of the control device shown in FIG. 1. FIG. 3 is a schematic view showing an example of an outline of a user interface and its display screen shown in FIG. 1.

The term "control device" in this specification includes a commonly-used control device that controls an operation of a plant, an exhibition facility or others, an operation control device that controls speed and attitude of transportation equipment or similar, a numerical controller to be applied to, such as, a machine tool, or a device that controls any control object, e.g., a control device for controlling an operation of a computer. In addition, the term "software" shall include, for instance, an operating system for providing an operating environment that forms the basis of a control device and an application program to be used according to a control purpose by an operator.

As shown in FIG. 1, a control device 100 according to the first embodiment is communicably interconnected via a wired or wireless line to a control object 10, a storage medium 20, and a user interface 30, by way of example. Furthermore, the control device 100 includes a main control unit 110, a software information storage unit 120, a recommended parameter creating unit 130 and a parameter storage unit 140.

The control object 10 includes, as described above, any devices that can be controlled by "control device" of the present application. The storage medium 20 stores, as an example, new software including item information of parameters, about which will be described later, and a data table that associates candidate values with arbitrary items. As such a storage medium 20, there are an optical disk and a reproducing device therefor, a magnetic disk, a storage medium such as semiconductor memory, a personal computer connected via a wired/wireless network, a computer such as an edge computing system, fog computing system or cloud server.

The user interface 30 includes, as shown in FIG. 3 for example, an input device 32 that allows an operator to input conditions necessary for control, additional information and others, and a display device 34 that works as a display screen for visually showing information from units included in the control device 100 to the operator. As such a user interface 30, there is an assembly formed by combining a monitor with a keyboard, a mouse, an MDI unit, an operation board and others, or a touch-panel input device, by way of example.

FIGS. 1 and 2 show the storage medium 20 and the user interface 30 as separate devices independent of the control device 100, but they are not limited to being externally connected to the control device 100. Alternatively, they may be incorporated into the control device 100.

The main control unit 110 is configured to control an operation of each of the illustrated units in the control device 100, and has a function of exchanging signals, data and others with the storage medium 20 and the user interface 30. In addition to that, the main control unit 110 reads various control programs from software stored in the software information storage unit 120, which will be described later, to thereby issue a command for performing the operation of the control object 10.

The software information storage unit 120 is configured to load software that is the base of an operation of the control device 100 from the storage medium 20 via the main control unit 110, and store and save the software. In this case, the software information storage unit 120 can store pieces of software before and after being updated (old software and new software), as well as additional information, such as functional information of the control object by the software.

In the first embodiment shown in FIG. 2, the software information storage unit 120 acquires, from the storage medium 20, and stores and saves new software SW1 that includes new item information I1 of a parameter to be set and candidate value information V1 corresponding to the item information I1. In here, the term "new item information" means information on items of parameters required by various functions performed by the software by taking consideration the configuration of the control object, for instance. The term "candidate value information" means information including information on candidates for "numerical value" and "range of numerical value" corresponding to "items" included in the new item information I1, information on a formula for computation of a candidate value, or information including conditions (rules) for setting the candidate value.

The recommended parameter creating unit 130 is configured to read the new item information I1 and the candidate value information V1 from the software information storage unit 120, so as to create a new recommended parameter RP1 that is candidate data to be presented to the operator. In the first embodiment shown in FIG. 2, the new recommended parameter RP1 is defined as including new items 110 and candidate values V10 created based on the new item information I1 and candidate value information V1 corresponding to the new item information.

The new recommended parameter RP1 created in the recommended parameter creating unit 130 is then sent to the display device 34 of the user interface 30 through the main control unit 110, and is also sent to the parameter storage unit 140 to be saved therein temporarily, about which will be described later.

The parameter storage unit 140 is configured to store and save parameters to be set according to software for operating the control device 100. The parameter storage unit 140 has a function of storing parameters before being updated (see old setting parameter RP2 in FIG. 8), in addition to temporarily saving the new recommended parameter RP1 sent from the recommended parameter creating unit 130. The parameter storage unit 140 then stores and saves one of the new recommended parameter RP1 as a new setting parameter SP1 that is selected through the main control unit 110 by the operator using the input device 32.

Next, a description will be made about a procedure of a method of updating parameters in the control device according to the first embodiment by referring to FIGS. 2 and 3.

In the method of updating parameters in the control device 100 of the first embodiment, the software information storage unit 120 first loads (acquires) and stores the new software SW1 including the new item information I1 from the storage medium 20 via the main control unit 110. The software information storage unit 120 then sends new item information I1 and candidate value information V1 of the loaded new software SW1 to the recommended parameter creating unit 130.

Then, the recommended parameter creating unit 130 extracts new items I10 actually included in the new recommended parameter RP1 from the candidate value information V1 that corresponds to the new item information I1, and computes candidate values V10 to create a new recommended parameter RP1. The recommended parameter creating unit 130 then sends the created new recommended parameter RP1 to the parameter storage unit 140.

Then, the main control unit 110 sends the new recommended parameter RP1 created in the recommended parameter creating unit 130 to the user interface 30 and causes the display device 34 to display the parameters as a display screen. The display device 34 displays the new recommended parameter RP1 with the new items 110 and corresponding candidate values V10 in the form of a list.

FIG. 3 illustrates, as an example, that the display device 34 has a display button B1 that displays a question, e.g., "Do you adopt presented information?", and display buttons B2 that displays specific options, such as "Item Selection" and "Candidate Value Selection". When an operator viewing the display screen selects (press) the display button B1 by using such as the input device 32, all contents of the new recommended parameter RP1 created by the recommended parameter creating unit 130 are adopted as a new setting parameter SP1.

The selection made by the operator is transmitted from the input device 32 to the parameter storage unit 140 via the main control unit 110, as shown in FIG. 2, and thereby the new recommended parameter RP1 stored temporarily in the parameter storage unit 140 is stored and saved as the new setting parameter SP1. Consequently, the new setting parameter SP1 corresponding to the new software SW1 are updated in the parameter storage unit 140.

If the items or candidate values are modified in the new recommended parameter RP1 shown in FIG. 3, the operator may select (press) the display button B2 by using the input device 32 or others. Thus, for example, a part of the items or the candidate values presented as the new recommended parameter RP1 can be added, deleted or changed by direct manual entry from the input device 32 to thereby update the parameters.

With the above configuration and operation, the control device and the method for updating parameters of the device according to the first embodiment of the invention can create new recommended parameters based on new item information and candidate value information of new software acquired from a storage medium, and store a parameter selected from the new recommended parameters by an operator as a new setting parameter, thereby reducing a burden on the operator to update parameters associated with software update and providing flexibility in setting the parameters.

Second Embodiment

Figure 4:
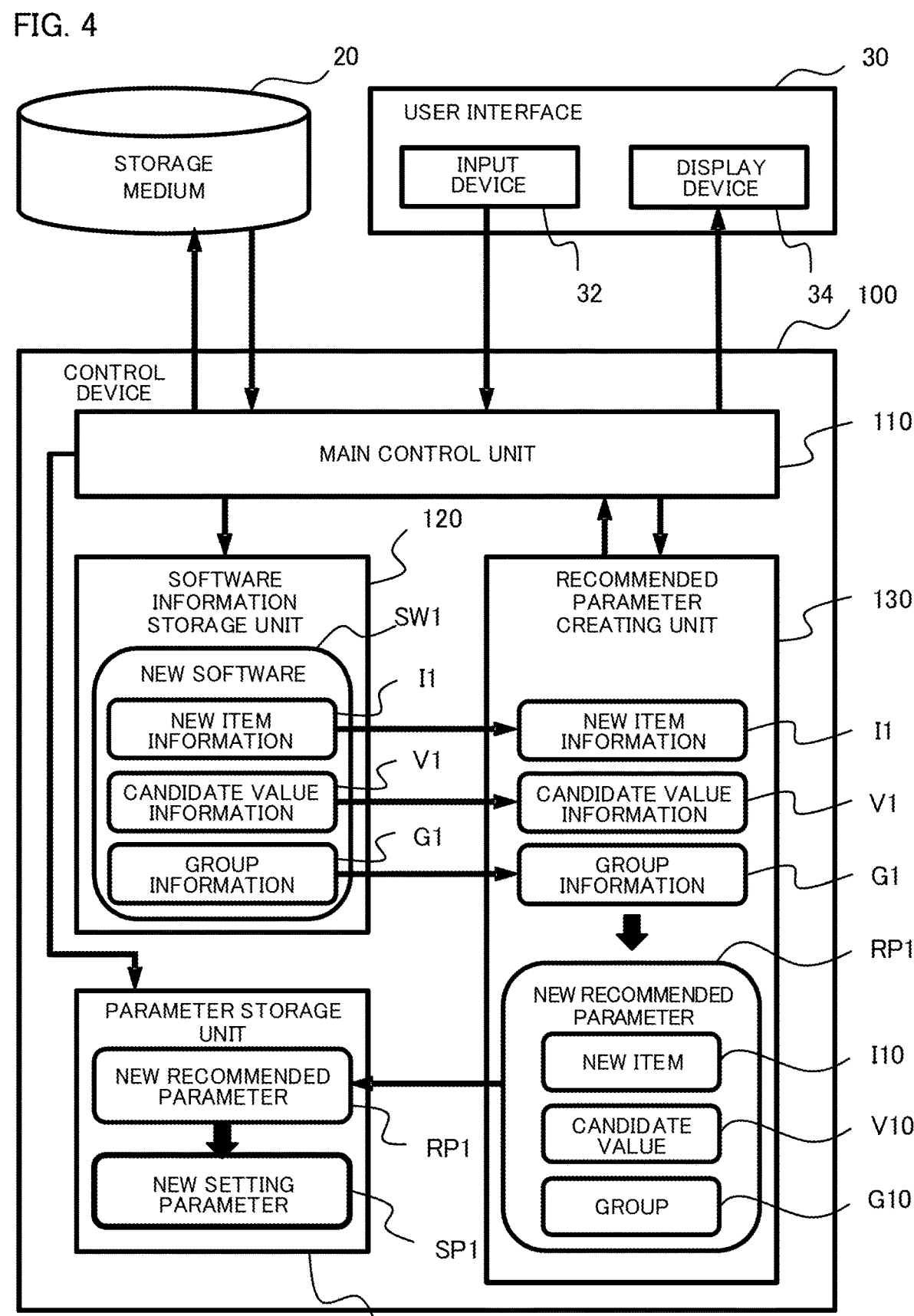
FIG. 4 is a block diagram showing an example of a specific configuration and an operation of a control device according to a second embodiment.
Figure 5:
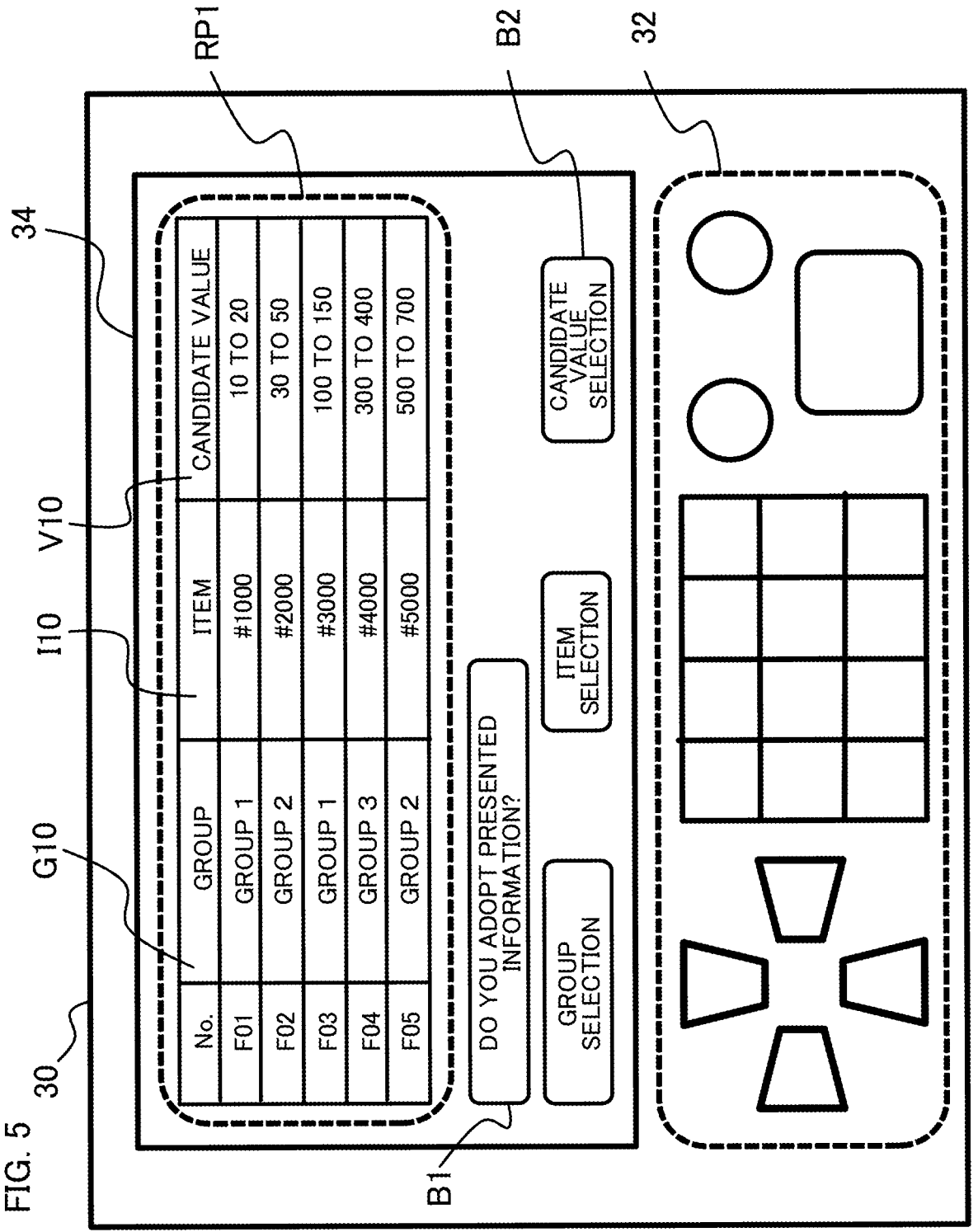
FIG. 5 is a schematic view showing an example of an outline of a user interface and its display screen according to the second embodiment.

FIG. 4 shows another example of the present invention. FIG. 4 is a block diagram showing an example of a specific configuration and an operation of a control device according to a second embodiment. Furthermore, FIG. 5 is a schematic view showing an example of an outline of a user interface and its display screen in the second embodiment. In the second embodiment, if components similar to or common to those in the first embodiment shown in the block diagram and other diagrams in FIGS. 1 to 3 can be adopted, the same symbols/reference numerals are assigned to the concerned components, and the description about them will not be repeated.

In the second embodiment, as shown in FIG. 4, new software SW1 stored and saved in a software information storage unit 120 is configured to include new item information I1 and candidate value information V1 as well as group information G1 that corresponds to the new item information I1. As the group information G1, parameters, which are considered to be efficient if they are grouped with respect to functions and operations of a control object 10, are flagged as a group corresponding to the new item information I1, e.g., as a "group of parameters associated with a reduction of a cycle time", "group of parameters associated with an increase in quality of a worked surface" or "group of parameters associated with an increase in operability".

In the method for updating parameters of a control device 100 according to the second embodiment, as shown in FIG. 4, the software information storage unit 120 loads (acquires) and stores the new software SW1 including the new item information I1, the candidate value information V1 and the group information G1 from a storage medium 20 via a main control unit 110. The software information storage unit 120 then sends the new item information I1, the candidate value information V1 and the group information G1 of the loaded new software SW1 to the recommended parameter creating unit 130.

Then, the recommended parameter creating unit 130 reads the new item information I1, the candidate value information V1 and the group information G1 from the software information storage unit 120 to create a new recommended parameter RP1 that associates a new item 110 and a candidate value V10 with a group G10. The recommended parameter creating unit 130 then sends the created new recommended parameter RP1 to the parameter storage unit 140.

Then, the main control unit 110 sends the new recommended parameter RP1 created in the recommended parameter creating unit 130 to a user interface 30 and causes a display device 34 to display the parameters as a display screen. The display device 34 displays the new recommended parameter RP1 such that the new item I10 and the candidate value V10 are displayed together with the group G10 in the form of a list, as shown in FIG. 5 for instance.

FIG. 5 illustrates, as an example, that the display device 34 has display buttons B2 displaying specific options, such as "Group Selection", "Item Selection" or "Candidate Value Selection". When an operator selects the display button B2 indicating "Group Selection" and inputs a group number to be selected through an input device 32, thereby selectively adopting parameters in a group desired by the operator for the functions and operations of the control object 10. As with the case of the first embodiment, a part of the groups, the items or the candidate values presented as the new recommended parameter RP1 can be directly added, deleted or changed to update the parameters by manual entry from the input device 32 after the selection by the display button B2.

With the above-described configuration and operation, the control device and the method for updating parameters of the device according to the second embodiment of the invention can provide the effects according to the first embodiment, and can further include group information to new software, in which parameters are grouped according to functions and operations of a control object, and add items of groups based on the group information to new recommended parameters to thereby enable selective update of parameters in a group that is desired by an operator in the control of the control object or suitable for concerned functions and operations. Consequently, an update operation can be simplified.

Third Embodiment

Figure 7:
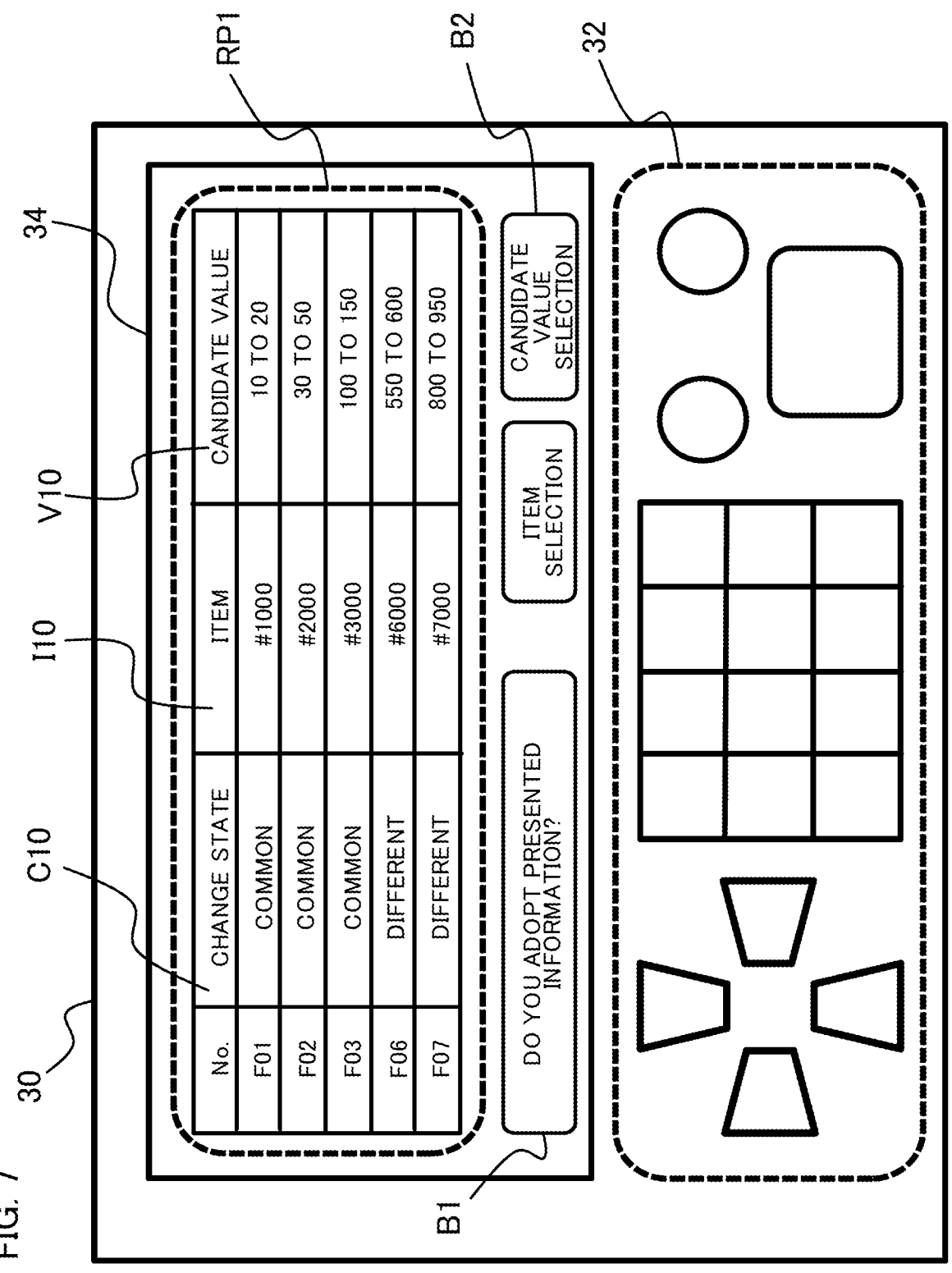
FIG. 7 is a schematic view showing an example of an outline of a user interface and its display screen according to the third embodiment.

FIG. 6 is a block diagram showing an example of a specific configuration and an operation of a control device according to a third embodiment, which is another example of the present invention. In addition to that, FIG. 7 is a schematic view showing an example of an outline of a user interface and its display screen according to the third embodiment. Also in the third embodiment, if the components similar to or common to those in the first embodiment shown in the block diagram and other diagrams in FIGS. 1 to 3 can be adopted, the same symbols/reference numerals are assigned to the concerned components, and the description about them will not be repeated.

In a control device 100 and a method for updating parameters for the device according to the third embodiment, as shown in FIG. 6, a software information storage unit 120 is configured to store and save in advance old software SW2 as software before being updated that includes old item information I2, and, in this state, to load new software SW1 that includes new item information I1 and candidate value information V1. In here, the term "old item information" means information on parameter items necessary for various functions performed by the old software SW2 in consideration of the configuration of a control object 10 and others.

In the third embodiment, a recommended parameter creating unit 130 is configured to further include a change information identifying unit 132 that creates change information C1 on items forming a new recommended parameter RP1 based on the new item information I1 and the old item information I2. Then, the recommended parameter creating unit 130 creates the new recommended parameter RP1 by taking account of the change information C1.

The change information identifying unit 132 is configured to compare the new item information I1 with the old item information I2 to identify common items and different items between them, and thereby create the change information C1 with the identified items. The "different items" may be new items in the new item information I1 that are not included in the old item information I2.

In the method for updating the parameters of the control device 100 according to the third embodiment, the software information storage unit 120 loads (acquires), from a storage medium 20 via a main control unit 110, and stores the new software SW1 including the new item information I1 and the candidate value information V1, as shown in FIG. 6. The software information storage unit 120 in turn sends the new item information I1 and the candidate value information V1 included in the loaded new software SW1 and the old item information I2 included in the old software SW2 to the recommended parameter creating unit 130.

Then, the change information identifying unit 132 compares the new item information I1 with the old item information I2 to identify matching items and different items between them, and creates the change information C1 based on an identification result. The change information C1 is then associated with new items I10 as change states C10 (see FIG. 7).

Then, based on the new item information I1 and the candidate value information V1 read from the software information storage unit 120 and the change information C1 created in the change information identifying unit 132, the recommended parameter creating unit 130 creates the new recommended parameter RP1 that associates the new items I10 and candidate values V10 with the change states C10. The recommended parameter creating unit 130 in turn sends the created new recommended parameter RP1 to a parameter storage unit 140.

Then, the main control unit 110 sends the new recommended parameter RP1 created in the recommended parameter creating unit 130 to a user interface 30, and causes a display device 34 to display the new recommended parameters as a display screen. The display device 34 displays the new recommended parameter RP1 such that the new items I10 and the candidate values V10 are displayed together with the change states C10 in the form of a list, as shown in FIG. 7 by way of example.

Since the display device 34 shown in FIG. 7 uses the indication "common" or "different" as the "change state" corresponding to "items" of parameters, an operator can understand that items displayed with the indication "different" in new and old parameters are newly added as functions. As a consequence, it is possible to suggest items to be particularly focused on to check them for the operator. As with the case of the first embodiment, a part of the items or the candidate values presented as the new recommended parameter RP1 can be directly added, deleted or changed to update the parameters by manual entry from the input device 32 after the selection by the display button B2.

Figure 8:
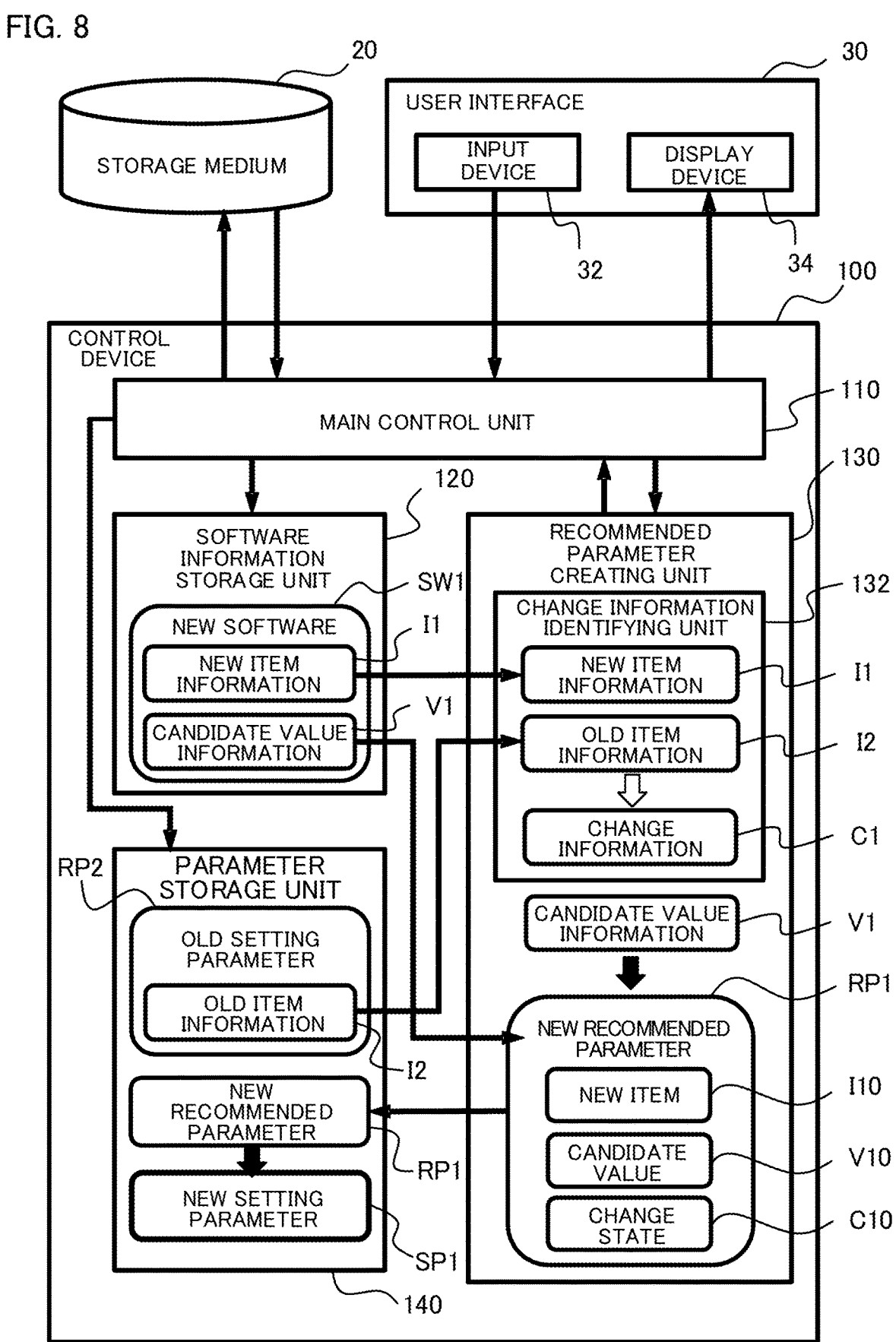
FIG. 8 is a block diagram showing an example of a specific configuration and an operation of a control device according to a variation of the third embodiment.

FIG. 8 is a block diagram showing an example of a specific configuration and an operation of a control device according to a variation of the third embodiment.

In the control device 100 and a method for updating parameters of the device according to the variation of the third embodiment, as shown in FIG. 8, the parameter storage unit 140 stores and saves in advance the old setting parameter SP2 including the old item information 12 as a parameter before updating software. As the old item information 12 used for creating the change information C1 by the above-described change information identifying unit 132, the information included in the old setting parameter SP2 is adopted.

In the variation of the third embodiment, since the parameter storage unit 140 generally stores and saves the parameters before the update (i.e., old setting parameters SP2) when updating the software, the old software SW2 can be deleted or rewritten when the software information storage unit 120 acquires the new software SW1. Thus, in a case where a data amount (or file size) of either the old software SW2 or the old setting parameter SP2 is large, the used capacity of the software information storage unit 120 or the parameter storage unit 140 can be reduced by applying the smaller amount.

In addition to the old item information 12, the old setting parameter SP2 includes candidate value information, not shown, that corresponds to the old item information. Thus, if an item is identified as "common" in the change information identifying unit 132 shown in FIG. 8, the recommended parameter creating unit 130 can change the parameters to apply the candidate value information included in the old setting parameter SP2 to the item identified as "common" while extracting only the candidate value information V1 of items identified as "different". It can reduce a load of accessing the storage medium 20 on the main control unit 110.

With the above-described configuration and the operation, the control device and the method for updating parameters of the device according to the third embodiment of the invention can provide the effects according to the first embodiment, and can further creates change information by comparing old item information included in old software or old setting parameters stored and saved when updating software with new item information, and presents the created information to an operator to suggest items to be particularly focused on to check it for the operator, thereby enabling to reduce a load on the operator during updating the parameters.

The present invention is not limited to the above-described embodiments and may be varies within the gist of the invention, as appropriate. In the present invention, any constituent elements in the embodiments can be varied within the scope of the invention, or any constituent elements in the embodiments can be omitted.

REFERENCE SIGNS LIST

10 Control Object
20 Storage Medium

30 User Interface
32 Input Device
34 Display Device
100 Control Device
110 Main Control Unit
120 Software Information Storage Unit
130 Recommended Parameter Creating Unit
132 Change Information Identifying Unit
140 Parameter Storage Unit

The invention claimed is:

1. A control device having a function of creating parameters for controlling an operation of a device and creating new setting parameters that are candidates of a parameter to be applied to new software when old software is updated to the new software, comprising a processor configured to:

acquire from a storage medium and store the new software including new item information and candidate value information, create new recommended parameters based on the new item information and the candidate value information, store one of the new recommended parameters selected by an operator from all the new recommended parameters as the new setting parameter, and control the operation of the device in accordance with the new setting parameter selected by the operator for the new software, wherein in response to an input made by the operator, the processor changes and stores the new item information and the candidate value information.

2. The control device according to claim 1, wherein the new software further includes group information that corresponds to the new item information, the processor adds groups that are set based on the group information to thereby create the new recommended parameters, and the processor adopts one of the new recommended parameters selected by the operator that correspond to the groups as the new setting parameter.

3. The control device according to claim 1, wherein the processor is further configured to store old software that includes old item information before an update, and compare the new item information with the old item information to create change information, and add a change state that is set based on the change information to create the new recommended parameters.

4. The control device according to claim 1, wherein the processor is further configured to store old setting parameters that include old item information before an update, and compare the new item information with the old item information to create change information, and add a change state that is set based on the change information to create the new recommended parameters.

* * * * *